(12) United States Patent
Tomoi

(10) Patent No.: US 12,071,541 B2
(45) Date of Patent: Aug. 27, 2024

(54) THERMOPLASTIC RESIN COMPOSITION FOR REFRIGERANT TRANSPORTING PIPING, AND METHOD FOR PRODUCING SAME

(71) Applicant: THE YOKOHAMA RUBBER CO., LTD., Tokyo (JP)

(72) Inventor: Shusaku Tomoi, Hiratsuka (JP)

(73) Assignee: THE YOKOHAMA RUBBER CO., LTD., Kanagawa (JP)

( * ) Notice: Subject to any disclaimer, the term of this patent is extended or adjusted under 35 U.S.C. 154(b) by 373 days.

(21) Appl. No.: 17/417,472

(22) PCT Filed: Dec. 17, 2019

(86) PCT No.: PCT/JP2019/049476
§ 371 (c)(1),
(2) Date: Jun. 23, 2021

(87) PCT Pub. No.: WO2020/137712
PCT Pub. Date: Jul. 2, 2020

(65) Prior Publication Data
US 2022/0073740 A1 Mar. 10, 2022

(30) Foreign Application Priority Data
Dec. 26, 2018 (JP) .................... 2018-243519

(51) Int. Cl.
| | | |
|---|---|---|
| C08L 77/02 | (2006.01) | |
| C08G 63/183 | (2006.01) | |
| C08G 63/189 | (2006.01) | |
| C08J 3/22 | (2006.01) | |
| C08J 3/24 | (2006.01) | |
| C08K 3/22 | (2006.01) | |
| C08K 5/098 | (2006.01) | |
| C08K 5/18 | (2006.01) | |
| C08K 5/3437 | (2006.01) | |
| C08K 5/3492 | (2006.01) | |
| C08L 23/22 | (2006.01) | |
| F16L 11/04 | (2006.01) | |

(52) U.S. Cl.
CPC ............ *C08L 77/02* (2013.01); *C08G 63/183* (2013.01); *C08G 63/189* (2013.01); *C08J 3/22* (2013.01); *C08J 3/24* (2013.01); *C08K 3/22* (2013.01); *C08K 5/098* (2013.01); *C08K 5/18* (2013.01); *C08K 5/3437* (2013.01); *C08K 5/34924* (2013.01); *C08L 23/22* (2013.01); *F16L 11/04* (2013.01); *C08K 2003/222* (2013.01); *C08K 2003/2296* (2013.01); *C08L 2201/14* (2013.01); *C08L 2203/18* (2013.01); *C08L 2205/22* (2013.01); *C08L 2312/00* (2013.01)

(58) Field of Classification Search
CPC ...... C08L 77/02; C08L 23/22; C08L 2201/14; C08L 2203/18; C08L 2205/22; C08L 2312/00; C08G 63/183; C08G 63/189; C08J 3/22; C08J 3/24; C08K 3/22; C08K 5/098; C08K 5/18; C08K 5/3437; C08K 5/34924; C08K 2003/222; C08K 2003/2296; F16L 11/04
See application file for complete search history.

(56) References Cited

U.S. PATENT DOCUMENTS

| | | | |
|---|---|---|---|
| 5,362,530 A | | 11/1994 | Kitami et al. |
| 2011/0186170 A1 | | 8/2011 | Oishi et al. |

FOREIGN PATENT DOCUMENTS

| | | | |
|---|---|---|---|
| JP | H04 145284 A | 5/1992 | |
| JP | 2002 212342 A | 7/2002 | |
| JP | 2006 063280 A | 3/2006 | |
| JP | 2004 003636 A | 1/2008 | |
| JP | 2011 522955 A | 8/2011 | |
| JP | 2014 095093 A | 5/2014 | |
| JP | 2014-166825 A | 9/2014 | |
| JP | 2015 520290 A | 7/2015 | |
| JP | P2016 501310 A | 1/2016 | |
| JP | 2018 523729 A | 8/2018 | |
| WO | WO 2013/191685 A1 | 12/2013 | |
| WO | WO 2014 099117 A1 | 6/2014 | |
| WO | WO 2017/019033 A1 | 2/2017 | |

OTHER PUBLICATIONS

English Machine translation of WO2014/156517 (Year: 2014).*
Arvind Mafatlal Group: "Antioxidants & Antidegradants", Dec. 31, 2010 (Dec. 31, 2010), pp. 1-44, XP055945563; Retrieved from the Internet: URL: https://www.nocil.com/Downloadfile/ETechnicalNote-Antioxidants-Dec2010.pdf.

* cited by examiner

*Primary Examiner* — Michael C Miggins
(74) *Attorney, Agent, or Firm* — POLSINELLI PC

(57) ABSTRACT

Provided is a thermoplastic resin composition for refrigerant transporting piping having high barrier properties, flexibility, and good extrusion processability. The thermoplastic resin composition for refrigerant transporting piping is composed of: a matrix containing a thermoplastic resin; and a domain containing a rubber dispersed in the matrix, and is characterized in that the thermoplastic resin has a melting point of 150° C. or higher, the rubber is a butyl-based rubber or an olefin-based rubber, the matrix contains a viscosity stabilizer, the thermoplastic resin composition contains a processing aid and at least one selected from the group consisting of a phenylenediamine-based anti-aging agent, a quinoline-based anti-aging agent, and a trihydric alcohol having a triazine skeleton, and at least a portion of the rubber is crosslinked.

18 Claims, No Drawings

THERMOPLASTIC RESIN COMPOSITION FOR REFRIGERANT TRANSPORTING PIPING, AND METHOD FOR PRODUCING SAME

CROSS REFERENCE TO RELATED APPLICATIONS

This application is a National Phase filing under 35 U.S.C. § 371 of PCT/JP2019/049476 filed on Dec. 17, 2019; which application in turn claims priority to Application No. 2018-243519 filed in Japan on Dec. 16, 2018. The entire contents of each application are hereby incorporated by reference.

FIELD

The present invention relates to a thermoplastic resin composition for refrigerant transporting piping, and a method of producing it. More specifically, the present invention relates to a thermoplastic resin composition for refrigerant transporting piping, wherein the composition comprises a matrix containing a thermoplastic resin and a rubber-containing domain dispersed in the matrix; and a method of producing it.

BACKGROUND

Due to an increasing demand for weight saving of automobiles, attempts are being made in order to realize the weight saving by reducing the thickness of the hoses for automobiles by using hoses prepared with resins having high barrier properties, instead of the rubber hoses that have been conventionally used for automobiles. In particular, since the hoses for refrigerant transportation for air conditioners of the automobiles at present use rubbers as the main material, the weight saving can be realized if the main material can be replaced with a resin having high barrier properties.

For example, Japanese Unexamined Patent Publication (Kokai) No. H04-145284 (Patent Literature 1) proposes, as a hose for transportation of a refrigerant such as Freon gas, a hose comprising an inner tube, a reinforcement layer, and an outer tube, wherein the inner tube has an inner layer formed of a polyamide-based resin, and an outer layer formed of a thermoplastic elastomer comprising a polyamide/acrylic rubber graft polymer alloy or thermoplastic polyolefin resin and an EPDM, butyl-based rubber, or acrylonitrile-butadiene rubber; the outer tube is formed of a thermoplastic elastomer comprising a thermoplastic polyolefin resin and an EPDM or butyl-based rubber.

CITATION LIST

Patent Literature

[Patent Literature 1] Japanese Unexamined Patent Publication (Kokai) No. H04-145284

SUMMARY

Technical Problem

The resin material constituting the hose of Patent Literature 1 has high barrier properties and excellent flexibility. However, its extrusion processability is not necessarily satisfactory.

An object of the present invention is to provide a thermoplastic resin composition for refrigerant transporting piping, which has high barrier properties, flexibility, and excellent extrusion processability.

Solution to Problem

The present invention provides a thermoplastic resin composition for refrigerant transporting piping, wherein the thermoplastic resin composition comprises a matrix containing a thermoplastic resin and a rubber-containing domain dispersed in the matrix; the thermoplastic resin has a melting point of not less than 150° C.; the rubber is a butyl-based rubber or olefin-based rubber; the matrix contains a viscosity stabilizer; the thermoplastic resin composition comprises at least one selected from the group consisting of a phenylenediamine-based antioxidant, quinoline-based antioxidant, and trihydric alcohol having a triazine skeleton, and a processing aid; and at least part of the rubber is cross-linked.

The present invention also provides a method of producing a thermoplastic resin composition for refrigerant transporting piping, wherein the composition comprises a matrix containing a thermoplastic resin and viscosity stabilizer and a rubber-containing domain dispersed in the matrix, comprising the steps of:
(1) adding the viscosity stabilizer to the thermoplastic resin, and kneading them;
(2) adding the rubber to the kneaded mixture obtained in step (1), and kneading them;
(3) adding a cross-linking agent to the kneaded mixture obtained in step (2); and
(4) cross-linking at least part of the rubber in the kneaded mixture containing the cross-linking agent obtained in step (3).

The present invention includes the following embodiments.

[1] A thermoplastic resin composition for refrigerant transporting piping, wherein the thermoplastic resin composition comprises a matrix containing a thermoplastic resin, and a rubber-containing domain dispersed in the matrix; the thermoplastic resin has a melting point of not less than 150° C.; the rubber is a butyl-based rubber or olefin-based rubber; the matrix contains a viscosity stabilizer; the thermoplastic resin composition comprises at least one selected from the group consisting of a phenylenediamine-based antioxidant, quinoline-based antioxidant, and trihydric alcohol having a triazine skeleton, and a processing aid; and at least part of the rubber is cross-linked.

[2] The thermoplastic resin composition for refrigerant transporting piping according to [1], wherein the viscosity stabilizer is at least one selected from the group consisting of a divalent metal oxide, an ammonium salt, and a carboxylic acid salt, and the content of the viscosity stabilizer in the matrix is 0.5 to 30% by weight.

[3] The thermoplastic resin composition for refrigerant transporting piping according to [2], wherein the divalent metal oxide is at least one selected from the group consisting of zinc oxide and magnesium oxide. [4] The thermoplastic resin composition for refrigerant transporting piping according to any one of [1] to [3], wherein the cross-linking is chemical cross-linking by the phenylenediamine-based antioxidant or the quinoline-based antioxidant, or cross-linking by hydrogen bonding by the trihydric alcohol having a triazine skeleton.

[5] The thermoplastic resin composition for refrigerant transporting piping according to any one of [1] to [4], wherein, in the thermoplastic resin composition, the volume ratio of the matrix is 30 to 70% by volume, and the volume ratio of the domain is 70 to 30% by volume; and, in the thermoplastic resin composition, the weight ratio of the thermoplastic resin is 30 to 80% by weight, and the weight ratio of the rubber is 15 to 65% by weight.

[6] The thermoplastic resin composition for refrigerant transporting piping according to any one of [1] to [5], wherein the thermoplastic resin is a polyamide-based resin, a polyester-based resin, or a polyvinyl alcohol-based resin.

[7] The thermoplastic resin composition for refrigerant transporting piping according to [6], wherein the polyamide-based resin is at least one selected from the group consisting of nylon 6, nylon 66, nylon 11, nylon 12, nylon 610, nylon 6/66 copolymer, nylon 6/12 copolymer, nylon 46, nylon 6T, nylon 9T, and nylon MXD6.

[8] The thermoplastic resin composition for refrigerant transporting piping according to [6], wherein the polyester-based resin is at least one selected from the group consisting of polyethylene terephthalate, polybutylene terephthalate, polyethylene naphthalate, polybutylene naphthalate, and polyester elastomers.

[9] The thermoplastic resin composition for refrigerant transporting piping according to [6], wherein the polyvinyl alcohol-based resin is at least one selected from the group consisting of polyvinyl alcohols, ethylene-vinyl alcohol copolymers, and modified ethylene-vinyl alcohol copolymers.

[10] The thermoplastic resin composition for refrigerant transporting piping according to any one of [1] to [9], wherein the butyl-based rubber is at least one selected from the group consisting of butyl rubbers, halogenated butyl rubbers, isobutylene-p-methylstyrene copolymer rubbers, halogenated isobutylene-p-methylstyrene copolymer rubbers, and styrene-isobutylene-styrene block copolymers.

[11] The thermoplastic resin composition for refrigerant transporting piping according to any one of [1] to [10], wherein the olefin-based rubber is at least one selected from the group consisting of ethylene-α-olefin copolymers, ethylene-ethyl acrylate copolymers, maleic anhydride-modified ethylene-α-olefin copolymers, maleic anhydride-modified ethylene-ethyl acrylate copolymers, and ethylene-glycidyl methacrylate copolymers.

[12] The thermoplastic resin composition for refrigerant transporting piping according to any one of [1] to [11], wherein the phenylenediamine-based antioxidant is at least one selected from the group consisting of N-phenyl-N'-(1,3-dimethylbutyl)-p-phenylenediamine, N-phenyl-N'-(1-methylheptyl)-p-phenylenediamine, N-phenyl-N'-isopropyl-p-phenylenediamine, N,N'-di-2-naphthyl-p-phenylenediamine, and N,N'-diphenyl-p-phenylenediamine, and the quinoline-based antioxidant is a 2,2,4-trimethyl-1,2-dihydroquinoline polymer.

[13] The thermoplastic resin composition for refrigerant transporting piping according to any one of [1] to [12], wherein the trihydric alcohol having a triazine skeleton is tris(2-hydroxyethyl)isocyanurate.

[14] The thermoplastic resin composition for refrigerant transporting piping according to any one of [1] to [13], wherein the processing aid is at least one selected from fatty acids, fatty acid metal salts, fatty acid esters, and fatty acid amides.

[15] A method of producing a thermoplastic resin composition for refrigerant transporting piping, wherein the composition comprises a matrix containing a thermoplastic resin and viscosity stabilizer and a rubber-containing domain dispersed in the matrix, comprising the steps of:

(1) adding the viscosity stabilizer to the thermoplastic resin, and kneading them;
(2) adding the rubber to the kneaded mixture obtained in step (1), and kneading them;
(3) adding a cross-linking agent to the kneaded mixture obtained in step (2); and
(4) cross-linking at least part of the rubber in the kneaded mixture containing the cross-linking agent obtained in step (3).

[16] A method of producing a thermoplastic resin composition for refrigerant transporting piping, wherein the composition comprises a matrix containing a thermoplastic resin and viscosity stabilizer and a rubber-containing domain dispersed in the matrix, comprising the steps of:

(1') preparing a masterbatch comprising the thermoplastic resin and the viscosity stabilizer;
(2') adding the masterbatch prepared in step (1') and the rubber to the thermoplastic resin, and kneading them;
(3') adding a cross-linking agent to the kneaded mixture obtained in step (2'); and
(4') cross-linking at least part of the rubber in the kneaded mixture containing the cross-linking agent, obtained in step (3').

[17] The method of producing a thermoplastic resin composition for refrigerant transporting piping according to [16], wherein the content of the viscosity stabilizer in the masterbatch is 10 to 80% by weight.

Advantageous Effects of Invention

The thermoplastic resin composition for refrigerant transporting piping of the present invention has high barrier properties, flexibility, and excellent extrusion processability.

DESCRIPTION OF EMBODIMENTS

The present invention is a thermoplastic resin composition for refrigerant transporting piping, wherein the thermoplastic resin composition comprises:
 a matrix containing a thermoplastic resin; and
 a rubber-containing domain dispersed in the matrix;
characterized in that
 the thermoplastic resin has a melting point of not less than 150° C.;
 the rubber is a butyl-based rubber or an olefin-based rubber;
 the matrix contains a viscosity stabilizer;
 the thermoplastic resin composition comprises:
 at least one selected from the group consisting of a phenylenediamine-based antioxidant, a quinoline-based antioxidant, and a trihydric alcohol having a triazine skeleton, and
 a processing aid; and
 at least part of the rubber is cross-linked.

The present invention relates to a thermoplastic resin composition for refrigerant transporting piping. The refrigerant transporting piping means piping for transportation of a refrigerant for an air conditioner or the like. The piping may be either a hose having flexibility, or may be a pipe which is hard and not easily deformed. The thermoplastic resin composition of the present invention can be especially preferably used for preparing a hose for transportation of a refrigerant for air conditioners of automobiles. A hose for transportation of a refrigerant is usually composed of an inner tube, a reinforcement layer, and an outer tube. The thermoplastic resin composition of the present invention can be especially preferably used for preparing the inner tube of a hose for transportation of a refrigerant.

The thermoplastic resin composition of the present invention comprises a matrix, and a domain dispersed in the matrix. In other words, the thermoplastic resin composition of the present invention has the so-called sea-island structure. The matrix corresponds to the sea, and the domain corresponds to the island. The ratio between the matrix and the domain is not limited as long as the effect of the present invention can be produced. Preferably, in the thermoplastic resin composition, the volume ratio of the matrix is 30 to 70% by volume, and the volume ratio of the domain is 70 to 30% by volume. The volume ratio of the matrix in the thermoplastic resin composition is more preferably 30 to 60% by volume, still more preferably 35 to 50% by volume. In cases where the volume ratio of the matrix is too low, there is a concern that phase inversion may occur between the matrix and the domain, to cause reversal of the sea-island structure, while in cases where the volume ratio of the matrix is too high, there is a concern that the desired flexibility may not be obtained due to a high content of the thermoplastic resin constituting the matrix.

The matrix contains a thermoplastic resin. The thermoplastic resin has a melting point of not less than 150° C. In cases where the thermoplastic resin composition of the present invention is used for piping for transportation of the refrigerant for an air conditioner of an automobile, the refrigerant transporting piping prepared using the thermoplastic resin composition of the present invention is placed in the engine room of the automobile. Since part of the inside of the engine room may be at a temperature close to 150° C., the thermoplastic resin used needs to have a melting point of not less than 150° C. The thermoplastic resin preferably has a melting point of 150 to 300° C., more preferably has a melting point of 170 to 270° C. In cases where the melting point of the thermoplastic resin is too high, the thermoplastic resin composition has poor moldability.

The thermoplastic resin is not limited as long as it has a melting point of not less than 150° C. The thermoplastic resin is preferably a polyamide-based resin, a polyester-based resin, or a polyvinyl alcohol-based resin.

Examples of the polyamide-based resin include nylon 6 (melting point: 225° C.), nylon 66 (melting point: 265° C.), nylon 11 (melting point: 187° C.), nylon 12 (melting point: 176° C.), nylon 610 (melting point: 225° C.), nylon 6/66 copolymer (melting point: 195° C.), nylon 6/12 copolymer (melting point: 201° C.), nylon 46 (melting point: 295° C.), nylon 6T (melting point: 320° C.), nylon 9T (melting point: 300° C.), and nylon MXD6 (melting point: 243° C.). The polyamide-based resin is preferably nylon 6, nylon 11, or nylon 6/66 copolymer.

Examples of the polyester-based resin include polyethylene terephthalate (melting point: 256° C.), polybutylene terephthalate (melting point: 225° C.), polyethylene naphthalate (melting point: 265° C.), polybutylene naphthalate (melting point: 243° C.), polyester elastomers (melting point: 160 to 227° C., depending on the copolymerization ratio between the crystalline phase and the amorphous phase). The polyester-based resin is preferably polybutylene terephthalate or a polyester elastomer.

Examples of the polyvinyl alcohol-based resin include polyvinyl alcohol (melting point: 230° C.), ethylene-vinyl alcohol copolymers (melting point: 158 to 195° C., depending on the copolymerization ratio between ethylene and vinyl alcohol), modified ethylene-vinyl alcohol copolymers (having a melting point which depends on the copolymerization ratio between ethylene and vinyl alcohol, the type of the modification, and the modification rate). The polyvinyl alcohol-based resin is preferably an ethylene-vinyl alcohol copolymer.

The matrix may contain one type of thermoplastic resin, or may contain two or more types of thermoplastic resins. As long as the effect of the present invention is not inhibited, the matrix may contain a thermoplastic resin having a melting point of less than 150° C.

The domain contains a rubber. The rubber is a butyl-based rubber or an olefin-based rubber.

The butyl-based rubber means a rubber having an isobutylene skeleton as a backbone of the polymer, and is preferably at least one selected from the group consisting of butyl rubbers, halogenated butyl rubbers, isobutylene-p-methylstyrene copolymer rubbers, halogenated isobutylene-p-methylstyrene copolymer rubbers, and styrene-isobutylene-styrene block copolymers.

The olefin-based rubber means a polymer of an alkene (olefin) as a monomer having rubber elasticity, and is preferably at least one selected from the group consisting of ethylene-α-olefin copolymers, ethylene-ethyl acrylate copolymers, maleic anhydride-modified ethylene-α-olefin copolymers, maleic anhydride-modified ethylene-ethyl acrylate copolymers, and ethylene-glycidyl methacrylate copolymers.

The rubber is more preferably a halogenated isobutylene-p-methylstyrene copolymer rubber, a maleic anhydride-modified ethylene-α-olefin copolymer, or the combination of a halogenated isobutylene-p-methylstyrene copolymer rubber and a maleic anhydride-modified ethylene-α-olefin copolymer.

The domain preferably contains both a butyl-based rubber and an olefin-based rubber. In cases where the amount of the rubber is increased using only a butyl-based rubber, the fluidity decreases. By using a thermoplastic olefin-based rubber in combination therewith, an increase in the amount of the rubber and securing of the fluidity can be achieved at the same time. The domain more preferably contains both a halogenated isobutylene-p-methylstyrene copolymer rubber and a maleic anhydride-modified ethylene-α-olefin copolymer.

The domain may contain one type of rubber, or may contain two or more types of rubbers. As long as the effect of the present invention is not inhibited, the domain may contain a rubber other than butyl-based rubbers and olefin-based rubbers.

The weight ratio of the thermoplastic resin in the thermoplastic resin composition is preferably 30 to 80% by weight, more preferably 30 to 70% by weight, still more preferably 35 to 60% by weight. In cases where the weight ratio of the thermoplastic resin in the thermoplastic resin composition is too low, there is a concern that phase inversion may occur between the matrix and the domain, to cause reversal of the sea-island structure, while in cases where the weight ratio of the thermoplastic resin is too high, there is a concern that the desired flexibility may not be obtained due to a high content of the thermoplastic resin constituting the matrix.

The weight ratio of the rubber in the thermoplastic resin composition is preferably 15 to 65% by weight, more preferably 30 to 65% by weight, still more preferably 40 to 60% by weight. In cases where the weight ratio of the rubber in the thermoplastic resin composition is too low, there is a concern that the desired flexibility may not be obtained, while in cases where the weight ratio of the rubber is too high, there is a concern that phase inversion may occur between the matrix and the domain, to cause reversal of the sea-island structure.

The matrix contains a viscosity stabilizer. By the inclusion of the viscosity stabilizer in the matrix, the increase in the viscosity during extrusion molding of the thermoplastic resin composition can be suppressed, so that generation of resident particles can be effectively reduced.

Examples of the viscosity stabilizer include divalent metal oxides, ammonium salts, and carboxylic acid salts.

Examples of the divalent metal oxides include zinc oxide, magnesium oxide, copper oxide, calcium oxide, and iron oxide. Zinc oxide or magnesium oxide is preferred. Zinc oxide is more preferred.

Examples of the ammonium salts include ammonium carbonate, ammonium hydrogen carbonate, ammonium chloride, ammonium bromide, ammonium sulfate, ammonium nitrate, ammonium acetate, and alkylammonium.

Examples of the carboxylic acid salts include sodium acetate, potassium acetate, zinc acetate, copper acetate, sodium oxalate, ammonium oxalate, calcium oxalate, and iron oxalate.

The viscosity stabilizer is most preferably zinc oxide.

The content of the viscosity stabilizer in the matrix is preferably 0.5 to 30% by weight, more preferably 1 to 25% by weight, still more preferably 5 to 20% by weight. In cases where the content of the viscosity stabilizer in the matrix is too low, there is a concern that an increase in the viscosity of the thermoplastic resin composition may not be suppressed, while in cases where the content is too high, there is a concern that the resin ratio in the matrix may be low, leading to poor extrusion processability.

The content of the viscosity stabilizer in the matrix can be measured as follows. First, the matrix is dissolved using a solvent which dissolves the thermoplastic resin constituting the matrix, but which does not dissolve the rubber as the domain, to separate and remove the rubber component. By treating the resulting matrix solution by acid treatment or the like, an analytical sample solution is obtained. The analytical sample solution is then subjected to ICP emission spectrometry, atomic absorption spectrometry, or the like to measure the content of the viscosity stabilizer. Examples of solvents that may be used for dissolving the thermoplastic resin constituting the matrix include hexafluoroisopropanol (HFIP), trifluoroacetic acid (TFA), formic acid, and cresol.

The thermoplastic resin composition comprises at least one selected from the group consisting of a phenylenediamine-based antioxidant, a quinoline-based antioxidant, and a trihydric alcohol having a triazine skeleton.

The phenylenediamine-based antioxidant means an antioxidant whose molecular structure contains an aromatic ring having two secondary amines as substituents. The phenylenediamine-based antioxidant is preferably at least one selected from the group consisting of N-phenyl-N'-(1,3-dimethylbutyl)-p-phenylenediamine, N-phenyl-N'-(1-methylheptyl)-p-phenylenediamine, N-phenyl-N'-isopropyl-p-phenylenediamine, N,N'-di-2-naphthyl-p-phenylenediamine, and N,N'-diphenyl-p-phenylenediamine. The phenylenediamine-based antioxidant is more preferably N-phenyl-N'-(1,3-dimethylbutyl)-p-phenylenediamine.

The quinoline-based antioxidant means an antioxidant whose molecular structure has a quinoline skeleton. The quinoline-based antioxidant is preferably a 2,2,4-trimethyl-1,2-dihydroquinoline polymer.

The trihydric alcohol having a triazine skeleton is preferably, but not limited to, tris(2-hydroxyethyl)isocyanurate.

The phenylenediamine-based antioxidant, the quinoline-based antioxidant, and the trihydric alcohol having a triazine skeleton function as cross-linking agents for rubbers. The phenylenediamine-based antioxidant and the quinoline-based antioxidant especially contribute to chemical cross-linking of butyl-based rubbers. The trihydric alcohol having a triazine skeleton especially contributes to cross-linking of olefin-based rubbers through hydrogen bonds.

The amount of the phenylenediamine-based antioxidant or the quinoline-based antioxidant added is preferably 0.5 to 20 parts by weight, more preferably 1 to 15 parts by weight, still more preferably 2 to 5 parts by weight based on 100 parts by weight of the butyl-based rubber. In cases where the amount of the phenylenediamine-based antioxidant or the quinoline-based antioxidant added is too small, there is a concern that cross-linking of the rubber may be insufficient, leading to poor durability of the thermoplastic resin composition, while in cases where the amount is too large, there is a concern that scorch may occur during the kneading or the extrusion process, or that the external appearance may be poor due to fisheyes and/or the like.

The amount of the trihydric alcohol having a triazine skeleton added is preferably 0.5 to 20 parts by weight, more preferably 1 to 15 parts by weight, still more preferably 2 to 5 parts by weight based on 100 parts by weight of the olefin-based rubber. In cases where the amount of the trihydric alcohol having a triazine skeleton added is too small, there is a concern that cross-linking of the rubber may be insufficient, leading to poor durability of the thermoplastic resin composition, while in cases where the amount is too large, there is a concern that scorch may occur during the kneading or the extrusion process, or that the external appearance may be poor due to fisheyes and/or the like.

At least part of the rubber is cross-linked. By the cross-linking of the rubber, the fatigue properties can be improved.

The cross-linking is preferably chemical cross-linking by the phenylenediamine-based antioxidant or the quinoline-based antioxidant, or cross-linking by hydrogen bonding by the trihydric alcohol having a triazine skeleton. The cross-linking of the butyl-based rubber is preferably chemical cross-linking by the phenylenediamine-based antioxidant or the quinoline-based antioxidant. The cross-linking of the olefin-based rubber is preferably cross-linking by hydrogen bonding by the trihydric alcohol having a triazine skeleton.

The thermoplastic resin composition comprises a processing aid. Together with the viscosity stabilizer, the processing aid contributes to improvement of the extrusion processability of the thermoplastic resin composition.

The processing aid is preferably, but not limited to, at least one selected from fatty acids, fatty acid metal salts, fatty acid esters, and fatty acid amides.

Examples of the fatty acids include stearic acid, palmitic acid, lauric acid, oleic acid, linoleic acid. Stearic acid is preferred.

Examples of the fatty acid metal salts include calcium stearate, potassium stearate, zinc stearate, magnesium stearate, and sodium stearate. Calcium stearate is preferred.

Examples of the fatty acid esters include glycerin monostearate, sorbitan stearate, stearyl stearate, and ethylene glycol distearate.

Examples of the fatty acid amides include stearamide, oleamide, and ethylenebis(stear amide).

The content of the processing aid is preferably 0.2 to 10% by weight, more preferably 1 to 8% by weight, still more preferably 1 to 5% by weight based on the weight of the thermoplastic resin composition. In cases where the content of the processing aid is too low, there is a concern that the extrusion processability may be poor, while in cases where the content is too high, there is a concern that the thermoplastic resin composition may have poor barrier properties.

The thermoplastic resin composition of the present invention may contain various additives in addition to the components described above.

The thermoplastic resin composition of the present invention may contain, for example, a plasticizer. Examples of the plasticizer include polyols (such as ethylene glycol, diethylene glycol, glycerin, and sorbitol), esters of polyols (such as glycerin triacetate), amide compounds (such as N-butylbenzenesulfonamide and N-methylpyrrolidone), alkylene oxides (such as ethylene oxide and propylene oxide), benzoates (such as octyl p-hydroxybenzoate and 2-ethylhexyl p-hydroxybenzoate), phthalates (such as dimethyl phthalate and dioctyl phthalate), and phosphates (such as triphenyl phosphate). N-Butylbenzenesulfonamide or glycerin triacetate is preferred. The content of the plasticizer is preferably 0 to 25 parts by weight, more preferably 1 to 20 parts by weight, still more preferably 2 to 15 parts by weight based on 100 parts by weight of the thermoplastic resin composition. In cases where the content of the plasticizer is too high, there is a concern that the thermoplastic resin composition may have poor barrier properties.

The production method of the present invention is a method of producing a thermoplastic resin composition for refrigerant transporting piping, wherein the composition comprises:
  a matrix containing a thermoplastic resin and a viscosity stabilizer, and
  a rubber-containing domain dispersed in the matrix;
wherein the method comprises the steps of:
  (1) adding the viscosity stabilizer to the thermoplastic resin, and kneading them;
  (2) adding the rubber to the kneaded mixture obtained in step (1), and kneading them;
  (3) adding a cross-linking agent to the kneaded mixture obtained in step (2); and
  (4) cross-linking at least part of the rubber in the kneaded mixture containing the cross-linking agent obtained in step (3).

In cases where the rubber and the viscosity stabilizer are added to the thermoplastic resin at the same time and are kneaded, the viscosity stabilizer is distributed in both the thermoplastic resin phase (matrix) and the rubber phase (domain). However, in cases where the viscosity stabilizer is preliminarily added to the thermoplastic resin followed by kneading, and then the rubber is added to the kneaded mixture followed by kneading, most part of the viscosity stabilizer remains in the thermoplastic resin phase (matrix) without being transferred to the rubber phase (domain). Thus, by preliminarily adding the viscosity stabilizer to the thermoplastic resin and kneading the resulting mixture before the addition of the rubber, a thermoplastic resin composition in which the matrix contains the viscosity stabilizer can be prepared.

Step (1) is a step of adding the viscosity stabilizer to the thermoplastic resin, and kneading the resulting mixture. The method of adding the viscosity stabilizer to the thermoplastic resin, and kneading the resulting mixture is not limited. For example, the method may be carried out using a kneader, banbury mixer, single-screw kneading extruder, twin-screw kneading extruder, or the like. It is preferably carried out using a twin-screw kneading extruder. The kneading temperature and time are not limited as long as a sufficiently uniform kneaded mixture can be obtained. In cases where a twin-screw kneading extruder is used, the kneading temperature is preferably 160 to 300° C., and the kneading time (residence time) is preferably 10 seconds to 5 minutes.

Step (2) is a step of adding the rubber to the kneaded mixture obtained in step (1), and then kneading the resulting mixture. The method of adding the rubber and kneading the resulting mixture is not limited. For example, the method may be carried out using a kneader, banbury mixer, single-screw kneading extruder, twin-screw kneading extruder, or the like. It is preferably carried out using a twin-screw kneading extruder. The kneading temperature and time are not limited as long as a sufficiently uniform kneaded mixture can be obtained. In cases where a twin-screw kneading extruder is used, the kneading temperature is preferably 160 to 300° C., and the kneading time (residence time) is preferably 10 seconds to 5 minutes.

Step (3) is a step of adding the cross-linking agent to the kneaded mixture obtained in step (2). The method of adding the cross-linking agent is not limited. For example, the method may be carried out using a kneader, banbury mixer, single-screw kneading extruder, twin-screw kneading extruder, or the like.

Step (4) is a step of cross-linking at least part of the rubber in the kneaded mixture containing the cross-linking agent, obtained in step (3). The method of the cross-linking is not limited. For example, the method may be carried out by heat-kneading using a kneader, banbury mixer, single-screw kneading extruder, twin-screw kneading extruder, or the like. Preferably, dynamic cross-linking is carried out by kneading at 160 to 300° C. using a twin-screw kneading extruder. The kneading time (residence time) is preferably 10 seconds to 5 minutes.

Steps (1) to (4) may be carried out by a batch method using separate apparatuses, or may be carried out continuously using a single kneading extruder. In cases where the cross-linking is continuously carried out, for example, a twin-screw kneading extruder having at least three feed inlets is used. The thermoplastic resin and the viscosity stabilizer are fed into a first feed inlet. The rubber is fed into a second feed inlet, which is located downstream of the first feed inlet.

The cross-linking agent is fed into a third feed inlet, which is located downstream of the second feed inlet.

In the method of the present invention, a masterbatch containing the thermoplastic resin and the viscosity stabilizer may be preliminarily prepared. In cases where the masterbatch is prepared, the method of the present invention comprises the steps of:
  (1') preparing a masterbatch comprising the thermoplastic resin and the viscosity stabilizer;
  (2') adding the masterbatch prepared in step (1') and the rubber to the thermoplastic resin, and kneading them;
  (3') adding a cross-linking agent to the kneaded mixture obtained in step (2'); and
  (4') cross-linking at least part of the rubber in the kneaded mixture containing the cross-linking agent, obtained in step (3').

In cases where the masterbatch containing the thermoplastic resin and the viscosity stabilizer is preliminarily prepared, and then the masterbatch and the rubber are added to the thermoplastic resin, followed by kneading the resulting mixture, most part of the viscosity stabilizer remains in the thermoplastic resin phase (matrix) without being transferred to the rubber phase (domain). Thus, a thermoplastic resin composition in which the matrix contains the viscosity stabilizer can be prepared.

Step (1') is a step of preparing a masterbatch comprising the thermoplastic resin and the viscosity stabilizer. The masterbatch can be prepared by adding the viscosity stabilizer to the thermoplastic resin, and kneading the resulting mixture.

The content of the viscosity stabilizer in the masterbatch is preferably 10 to 80% by weight, more preferably 20 to 70% by weight, still more preferably 40 to 60% by weight. In cases where the content of the viscosity stabilizer in the masterbatch is too low, the amount of the masterbatch added for the kneading of the thermoplastic resin composition is large, resulting in a low production efficiency, while in cases where the content is too high, the viscosity stabilizer is not completely incorporated into the thermoplastic resin, so that the masterbatch cannot be prepared.

The kneading may be carried out using, for example, a kneader, banbury mixer, single-screw kneading extruder, twin-screw kneading extruder, or the like. It is preferably carried out using a twin-screw kneading extruder. The kneading temperature and time are not limited as long as a sufficiently uniform kneaded mixture can be obtained. In cases where a twin-screw kneading extruder is used, the kneading temperature is preferably 160 to 300° C., and the kneading time (residence time) is preferably 1 minute to 5 minutes. The masterbatch is preferably pelletized using a strand cutter or a pelletizer.

Step (2') is a step of adding the masterbatch prepared in step (1') and the rubber to the thermoplastic resin, and then kneading the resulting mixture. The method of the kneading is not limited. For example, the method may be carried out using a kneader, banbury mixer, single-screw kneading extruder, twin-screw kneading extruder, or the like. It is preferably carried out using a twin-screw kneading extruder. The kneading temperature and time are not limited as long as a sufficiently uniform kneaded mixture can be obtained. In cases where a twin-screw kneading extruder is used, the kneading temperature is preferably 160 to 300° C., and the kneading time (residence time) is preferably 10 seconds to 5 minutes.

Step (3') is a step of adding the cross-linking agent to the kneaded mixture obtained in step (2'). The method of adding the cross-linking agent is not limited. For example, the method may be carried out using a kneader, banbury mixer, single-screw kneading extruder, twin-screw kneading extruder, or the like.

Step (4') is a step of cross-linking at least part of the rubber in the kneaded mixture containing the cross-linking agent, obtained in step (3'). The method of the cross-linking is not limited. For example, the method may be carried out by heat-kneading using a kneader, banbury mixer, single-screw kneading extruder, twin-screw kneading extruder, or the like. Preferably, dynamic cross-linking is carried out by kneading at 160 to 300° C. using a twin-screw kneading extruder. The kneading time (residence time) is preferably 10 seconds to 5 minutes.

Step (1') is carried out using an apparatus which is separate from the apparatus(es) for steps (2') to (4').

Steps (2') to (4') may be carried out by a batch method using separate apparatuses, or may be carried out continuously using a single kneading extruder. In cases where the steps are continuously carried out, for example, a twin-screw kneading extruder having at least two feed inlets is used. The thermoplastic resin, the rubber, and the masterbatch are fed into a first feed inlet. The cross-linking agent is fed into a second feed inlet, which is located downstream of the first feed inlet. Steps (2') to (4') may be carried out at the same time (by a single step) in a single apparatus. Thus, all of the masterbatch prepared in step (1'), the thermoplastic resin, the rubber, and other raw materials may be fed into the kneader at the same time. In such a case, the kneading temperature may be appropriately controlled such that cross-linking of the rubber proceeds after the rubber is dispersed in the matrix of the masterbatch and the thermoplastic resin.

EXAMPLES

The present invention is described below more concretely based on Examples. However, the present invention is not limited to the following Examples.

(1) Raw Materials

The raw materials used in the following Examples and Comparative Examples are as follows:

Nylon-1: nylon 11, RILSAN® BESNO TL, manufactured by Arkema and having a melting point of 187° C.

Nylon-2: nylon 6, UBE Nylon 1011FB, manufactured by Ube Industries, Ltd. and having a melting point of 225° C.

Nylon-3: nylon 6/66 copolymer, UBE Nylon 5023B, manufactured by Ube Industries, Ltd. and having a melting point of 195° C.

EVOH: ethylene-vinyl alcohol copolymer having an ethylene content of 48%, Soarnol® H4815, manufactured by The Nippon Synthetic Chemical Industry Co., Ltd. and having a melting point of 158° C.

Polyester: polybutylene terephthalate, Novaduran® 5010R, manufactured by Mitsubishi Engineering-Plastics Corporation and having a melting point of 224° C.

Butyl-based rubber: brominated isobutylene-p-methylstyrene copolymer rubber, EXXPRO® 3745, manufactured by ExxonMobil Chemical Company Olefin-based rubber: maleic acid-modified α-olefin copolymer, Tafmer® MH7020, manufactured by Mitsui Fine Chemicals, Inc.

Zinc oxide: zinc oxide (type 3), manufactured by Seido Chemical Industry Co., Ltd.

Stearic acid: stearic acid (industrial grade), manufactured by Chiba Fatty Acid Co., Ltd.

Calcium stearate: calcium stearate SC-PG, manufactured by Sakai Chemical Industry Co., Ltd.

Phenylenediamine-based antioxidant: N-phenyl-N'-(1,3-dimethylbutyl)-p-phenylenediamine, SANTOFLEX® 6PPD, manufactured by Solutia Inc.

Quinoline-based antioxidant: 2,2,4-trimethyl-1,2-dihydroquinoline polymer, Nocrac® 224, manufactured by Ouchi Shinko Chemical Industrial Co., Ltd.

Trihydric alcohol having a triazine skeleton: tris(2-hydroxyethyl)isocyanurate, THEIC, manufactured by Shikoku Chemicals Corporation Plasticizer: N-butylbenzenesulfonamide, BM-4, manufactured by Daihachi Chemical Industry Co., Ltd.

(2) Preparation of Thermoplastic Resin Compositions

The thermoplastic resin compositions shown in Table 1 and Table 2 were prepared by the following method. First, a butyl-based rubber was processed into a pellet shape using a rubber pelletizer (manufactured by Moriyama Seisakusho). Subsequently, a thermoplastic resin and zinc oxide (viscosity stabilizer) were mixed together such that the zinc oxide content was 50% by weight, to prepare a viscosity stabilizer masterbatch. When a plurality of thermoplastic resins were to be included, the masterbatch was prepared using the resin to be included in the largest amount. Subsequently, the raw materials were fed into a twin-screw kneading extruder (manufactured by The Japan Steel Works, Ltd.) at the blending ratios shown in Table 1 or Table 2, and the resulting mixture was kneaded at 235° C. for 3 minutes. The kneaded mixture was continuously extruded from the extruder into a strand shape, and then cooled with water, followed by cutting with a cutter, to obtain a thermoplastic resin composition in the form of pellets. The viscosity stabilizer (zinc oxide) was added as the masterbatch such that the desired amount was achieved. Since the viscosity stabilizer was added as the masterbatch that had been prepared with the thermoplastic resin, the viscosity stabilizer was allowed to be present in the thermoplastic resin phase.

In each of Comparative Examples 4 and 5, a desired amount of viscosity stabilizer (zinc oxide) was first kneaded with a rubber, and the resulting rubber was used to prepare a thermoplastic resin composition. Thus, the viscosity stabilizer was included in the rubber phase in Comparative Examples 4 and 5.

(3) Measurement of Viscosity Change Rate

The thermoplastic resin composition in the form of pellets prepared in above-mentioned (2) was subjected to preliminary drying at 100° C. for 4 hours, and then to measurement of the melt viscosity (Pa·s) by detection of the load using a capillary rheometer (Toyo Seiki Seisaku-sho, Ltd.) under the following conditions: temperature, 250° C.; piston speed, 5 mm/minute; capillary length, 10 mm; capillary inner diameter, 1 mm. The viscosity change rate was determined as $\eta_2/\eta_1 \times 100$, wherein $\eta_1$ represents the melt viscosity at 200 seconds after the beginning of the extrusion, and $\eta_2$ represents the melt viscosity at 800 seconds after the beginning of the extrusion. The viscosity change rate preferably does not exceed 100. The measurement results are shown in Table 1 and Table 2.

(4) Evaluation of Extrusion Performance

The thermoplastic resin composition in the form of pellets prepared in above-mentioned (2) was extruded using a T-die sheet molding apparatus (manufactured by Tomi Machinery Co., Ltd.) at 235° C., and pulled down onto a metal cooling roller, followed by being drawn by pinch rollers and wound onto a winder, to prepare a film of the thermoplastic resin composition. The film thickness was set to 100 μm, and evaluation was carried out as follows: "Good" in the case of successful molding without occurrence of problems; "Fair" in the case of formation/occurrence of particles, holes, sheet edge breakage, and/or the like at a minor level; "Poor" in the case of formation/occurrence of particles, holes, sheet edge breakage, and/or the like at a serious level. The evaluation results are shown in Table 1 and Table 2.

TABLE 1

| | | Melting point | Example 1 | Example 2 | Example 3 | Example 4 | Example 5 | Example 6 | Example 7 | Example 8 |
|---|---|---|---|---|---|---|---|---|---|---|
| Nylon-1 | Parts by weight | 187° C. | 38.5 | | | | | | | |
| Nylon-2 | Parts by weight | 225° C. | | 35.4 | 25.2 | 44.6 | 35.4 | 26.5 | 42.3 | |
| Nylon-3 | Parts by weight | 195° C. | | | 10.8 | | | | | 37.2 |
| EVOH | Parts by weight | 158° C. | | | | | | | | |
| Polyester | Parts by weight | 224° C. | | | | | | | | |
| Butyl-based rubber | Parts by weight | Amorphous | 56.2 | 59.0 | 38.9 | 33.5 | 32.3 | 31.2 | | 32.9 |
| Olefin-based rubber | Parts by weight | Amorphous | | | 19.6 | 20.9 | 20.2 | 19.5 | 52.5 | 20.5 |
| Zinc oxide | Parts by weight | — | 2.8 | 3.0 | 2.9 | 0.3 | 5.3 | 10.1 | 2.6 | 2.7 |
| Stearic acid | Parts by weight | — | 0.6 | 0.6 | 0.6 | 0.1 | 1.6 | 2.5 | 0.5 | 0.5 |
| Calcium stearate | Parts by weight | — | 0.8 | 0.9 | 0.9 | 0.1 | 2.6 | 5.1 | 1.1 | 1.1 |
| Phenylenediamine-based antioxidant | Parts by weight | — | 1.1 | 1.2 | 1.2 | 0.5 | 2.6 | 5.1 | | 1.1 |
| Quinoline-based antioxidant | Parts by weight | — | | | | | | | | |
| Trihydric alcohol having triazine skeleton | Parts by weight | — | | | | | | | 1.1 | |
| Plasticizer | Parts by weight | — | | | | | | | | 4.2 |
| Total | Parts by weight | | 100.0 | 100.0 | 100.0 | 100.0 | 100.0 | 100.0 | 100.0 | 100.0 |
| Rubber volume fraction | vol % | | 60 | 65 | 65 | 60 | 60 | 60 | 60 | 60 |
| Content of viscosity stabilizer in matrix | weight % | | 6.5 | 7.0 | 7.0 | 0.5 | 11.5 | 23.5 | 5.5 | 6.0 |
| Viscosity change rate | | | 85 | 90 | 90 | 98 | 85 | 80 | 80 | 90 |
| Extrusion performance | | | Good | Good | Good | Fair | Good | Good | Good | Good |

TABLE 2

| | | Melting point | Example 9 | Example 10 | Example 11 | Comparative Example 1 | Comparative Example 2 | Comparative Example 3 | Comparative Example 4 | Comparative Example 5 |
|---|---|---|---|---|---|---|---|---|---|---|
| Nylon-1 | Parts by weight | 187° C. | | | | | | | | |
| Nylon-2 | Parts by weight | 225° C. | | | 35.4 | 38.5 | 45.4 | 37.8 | 35.4 | 42.3 |
| Nylon-3 | Parts by weight | 195° C. | | | | | | | | |
| EVOH | Parts by weight | 158° C. | 40.5 | 32.0 | | | | | | |
| Polyester | Parts by weight | 224° C. | | 9.3 | | | | | | |
| Butyl-based rubber | Parts by weight | Amorphous | 16.8 | 16.5 | 59.0 | 60.3 | | 60.4 | 59.0 | |
| Olefin-based rubber | Parts by weight | Amorphous | 36.6 | 36.1 | | | 53.5 | | | 52.5 |
| Zinc oxide | Parts by weight | — | 2.7 | 2.6 | 2.9 | | | | 3.0 | 2.6 |
| Stearic acid | Parts by weight | — | 0.5 | 0.5 | 0.6 | | | 0.6 | 0.6 | 0.5 |
| Calcium stearate | Parts by weight | — | 1.1 | 1.1 | 0.9 | | | 1.2 | 0.9 | 1.1 |
| Phenylenediamine-based antioxidant | Parts by weight | — | 0.8 | 0.8 | 1.2 | | | 1.2 | | |

TABLE 2-continued

| | | Melting point | Example 9 | Example 10 | Example 11 | Comparative Example 1 | Comparative Example 2 | Comparative Example 3 | Comparative Example 4 | Comparative Example 5 |
|---|---|---|---|---|---|---|---|---|---|---|
| Quinoline-based antioxidant | Parts by weight | — | | | 1.2 | | | | | |
| Trihydric alcohol having triazine skeleton | Parts by weight | — | 1.1 | 1.1 | | | | 1.1 | | 1.1 |
| Plasticizer | Parts by weight | — | | | | | | | | |
| Total | Parts by weight | — | 100.0 | 100.0 | 100.0 | 100.0 | 100.0 | 100.0 | 100.0 | 100.0 |
| Rubber volume fraction | vol % | | 60 | 60 | 65 | 65 | 60 | 65 | 65 | 60 |
| Content of viscosity stabilizer in matrix | weight % | | 5.5 | 5.5 | 7.0 | 0.0 | 0.0 | 0.0 | 0.0 | 0.0 |
| Viscosity change rate | | | 65 | 60 | 90 | 110 | 175 | 105 | 110 | 150 |
| Extrusion performance | | | Good | Good | Good | Poor | Poor | Poor | Poor | Poor |

INDUSTRIAL APPLICABILITY

The thermoplastic resin composition of the present invention can be favorably used for preparing refrigerant transporting piping.

The invention claimed is:

1. A thermoplastic resin composition for refrigerant transporting piping, wherein the thermoplastic resin composition comprises a matrix containing a thermoplastic resin, and a rubber-containing domain dispersed in the matrix; the thermoplastic resin has a melting point of not less than 150° C.; the rubber is a butyl-based rubber or olefin-based rubber; the matrix contains 5% to 30% by weight of a viscosity stabilizer; the thermoplastic resin composition comprises at least one selected from the group consisting of a phenylenediamine-based antioxidant, quinoline-based antioxidant, and trihydric alcohol having a triazine skeleton, and a processing aid; and at least part of the rubber is cross-linked.

2. The thermoplastic resin composition for refrigerant transporting piping according to claim 1, wherein the cross-linking is chemical cross-linking by the phenylenediamine-based antioxidant or the quinoline-based antioxidant, or cross-linking by hydrogen bonding by the trihydric alcohol having a triazine skeleton.

3. The thermoplastic resin composition for refrigerant transporting piping according to claim 1, wherein, in the thermoplastic resin composition, the volume ratio of the matrix is 30 to 70% by volume, and the volume ratio of the domain is 70 to 30% by volume; and, in the thermoplastic resin composition, the weight ratio of the thermoplastic resin is 30 to 80% by weight, and the weight ratio of the rubber is 15 to 65% by weight.

4. The thermoplastic resin composition for refrigerant transporting piping according to claim 1, wherein the butyl-based rubber is at least one selected from the group consisting of butyl rubbers, halogenated butyl rubbers, isobutylene-p-methylstyrene copolymer rubbers, halogenated isobutylene-p-methylstyrene copolymer rubbers, and styrene-isobutylene-styrene block copolymers.

5. The thermoplastic resin composition for refrigerant transporting piping according to claim 1, wherein the olefin-based rubber is at least one selected from the group consisting of ethylene-α-olefin copolymers, ethylene-ethyl acrylate copolymers, maleic anhydride-modified ethylene-α-olefin copolymers, maleic anhydride-modified ethylene-ethyl acrylate copolymers, and ethylene-glycidyl methacrylate copolymers.

6. The thermoplastic resin composition for refrigerant transporting piping according to claim 1, wherein the phenylenediamine-based antioxidant is at least one selected from the group consisting of N-phenyl-N'-(1,3-dimethylbutyl)-p-phenylenediamine, N-phenyl-N'-(1-methylheptyl)-p-phenylenediamine, N-phenyl-N'-isopropyl-p-phenylenediamine, N,N'-di-2-naphthyl-p-phenylenediamine, and N,N'-diphenyl-p-phenylenediamine, and the quinoline-based antioxidant is a 2,2,4-trimethyl-1,2-dihydroquinoline polymer.

7. The thermoplastic resin composition for refrigerant transporting piping according to claim 1, wherein the trihydric alcohol having a triazine skeleton is tris(2-hydroxyethyl)isocyanurate.

8. The thermoplastic resin composition for refrigerant transporting piping according to claim 1, wherein the processing aid is at least one selected from the group consisting of fatty acids, fatty acid metal salts, fatty acid esters, and fatty acid amides.

9. The thermoplastic resin composition for refrigerant transporting piping according to claim 1, wherein the viscosity stabilizer is at least one selected from the group consisting of a divalent metal oxide, an ammonium salt, and a carboxylic acid salt, and the content of the viscosity stabilizer in the matrix is 0.5 to 30% by weight.

10. The thermoplastic resin composition for refrigerant transporting piping according to claim 9, wherein the divalent metal oxide is at least one selected from the group consisting of zinc oxide and magnesium oxide.

11. The thermoplastic resin composition for refrigerant transporting piping according to claim 10, wherein the cross-linking is chemical cross-linking by the phenylenediamine-based antioxidant or the quinoline-based antioxidant, or cross-linking by hydrogen bonding by the trihydric alcohol having a triazine skeleton.

12. The thermoplastic resin composition for refrigerant transporting piping according to claim 9, wherein the cross-linking is chemical cross-linking by the phenylenediamine-based antioxidant or the quinoline-based antioxidant, or cross-linking by hydrogen bonding by the trihydric alcohol having a triazine skeleton.

13. The thermoplastic resin composition for refrigerant transporting piping according to claim 9, wherein, in the thermoplastic resin composition, the volume ratio of the matrix is 30 to 70% by volume, and the volume ratio of the domain is 70 to 30% by volume; and, in the thermoplastic resin composition, the weight ratio of the thermoplastic resin is 30 to 80% by weight, and the weight ratio of the rubber is 15 to 65% by weight.

14. The thermoplastic resin composition for refrigerant transporting piping according to claim 1, wherein the thermoplastic resin is a polyamide-based resin, a polyester-based resin, or a polyvinyl alcohol-based resin.

15. The thermoplastic resin composition for refrigerant transporting piping according to claim 14, wherein the polyamide-based resin is at least one selected from the group consisting of nylon 6, nylon 66, nylon 11, nylon 12, nylon 610, nylon 6/66 copolymer, nylon 6/12 copolymer, nylon 46, nylon 6T, nylon 9T, and nylon MXD6.

16. The thermoplastic resin composition for refrigerant transporting piping according to claim 14, wherein the polyester-based resin is at least one selected from the group consisting of polyethylene terephthalate, polybutylene terephthalate, polyethylene naphthalate, polybutylene naphthalate, and polyester elastomers.

17. The thermoplastic resin composition for refrigerant transporting piping according to claim 14, wherein the polyvinyl alcohol-based resin is at least one selected from the group consisting of polyvinyl alcohols, ethylene-vinyl alcohol copolymers, and modified ethylene-vinyl alcohol copolymers.

18. A refrigerant transporting pipe comprising a thermoplastic resin composition, wherein the thermoplastic resin composition comprises a matrix containing a thermoplastic resin, and a rubber-containing domain dispersed in the matrix; the thermoplastic resin has a melting point of not less than 150° C.; the rubber is a butyl-based rubber or olefin-based rubber; the matrix contains 5% to 30% by weight of a viscosity stabilizer; the thermoplastic resin composition comprises at least one selected from the group consisting of a phenylenediamine-based antioxidant, quinoline-based antioxidant, and trihydric alcohol having a triazine skeleton, and a processing aid; and at least part of the rubber is cross-linked.

* * * * *